United States Patent [19]
Young

[11] 3,842,454
[45] Oct. 22, 1974

[54] SLEEPING BAG

[76] Inventor: John P. Young, 4000 Via Vaquero Ave., Las Vegas, Nev. 89102

[22] Filed: Nov. 10, 1972

[21] Appl. No.: 305,464

[52] U.S. Cl. .................................. 5/343, 119/1
[51] Int. Cl. ...................... A47g 9/00, A01k 1/02
[58] Field of Search ............... 135/4, 5; 5/343, 344; 119/1, 19

[56] References Cited
UNITED STATES PATENTS

| | | | |
|---|---|---|---|
| 1,502,608 | 7/1924 | Young | 5/343 |
| 1,887,108 | 11/1932 | Steese | 119/19 |
| 2,671,427 | 3/1954 | Fell | 119/1 |
| 2,854,948 | 10/1958 | Drayson | 119/1 |
| 3,565,040 | 2/1971 | Pohl | 119/19 |

Primary Examiner—Paul R. Gilliam
Assistant Examiner—Andrew M. Calvert
Attorney, Agent, or Firm—Jerry R. Seiler

[57] ABSTRACT

A sleeping bag comprises a rigid frame having a lower component extending around the periphery of the bag and an upper component and biased upwardly therefrom and upper and lower covers detachably secured to the frame components to form a bag normally opened at one end between the upper and lower frame components.

4 Claims, 3 Drawing Figures

SLEEPING BAG

BACKGROUND OF THE INVENTION

Sleeping bags have long been used by persons in situations where conventional bedding or beds are not available for sleeping. Sleeping bags are used especially during cool evenings and take the place of blankets or other means for covering the person to prevent chilling.

Domestic animals and especially dogs who spend much of their time indoors become use to household temperatures, for example, usually between about 65° and about 75° F. Accordingly, such animals are not accustomed to temperature extremes and likely run the risk of becoming chilled much more readily than animals who spend much time out of doors, especially at night or during cold weather.

Further, many dogs, and especially those older animals, develop arthritis and when required to sleep or lie on cold hard floors, are known or believed to have more discomfort and irritation to arthritic joints than would be expected from lying on warm or carpeted or otherwise cushioned surfaces.

SUMMARY OF THE INVENTION

It is to the elimination of the above problems and especially to a sleeping compartment for domestic animals that the present invention is intended. The concept involves a sleeping bag which has upper and lower covers between which an animal may lie and which includes a rigid frame around the periphery of the bag and which frame provides for the bag to be normally maintained in an open position at one end. The rigid frame comprises a lower rigid frame component such as a metal rod having the general shape of the outline of the periphery of the sleeping bag covers. Normally the shape is oblong, elliptical or similar elongated shape such as rectangular along which the animal may lie. At one end of the device the upper and lower covers are normally held apart or separated by an upper frame component. This upper component may be biased upwardly by the use of a pair of biased members or spring hinges which connect or attach the upper frame component to the lower frame component.

DETAILED DESCRIPTION OF THE INVENTION

Figure 1:
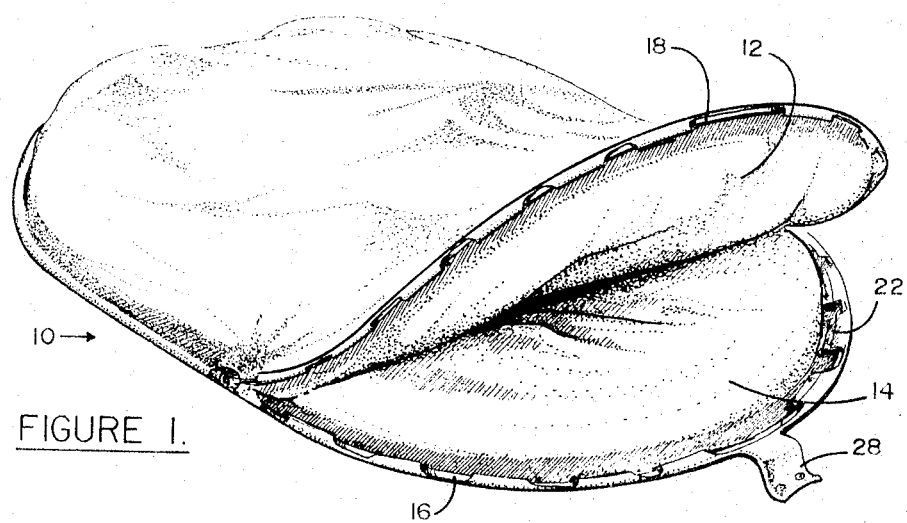
FIG. 1 is a perspective view of the animal sleeping bag of the invention.

Referring to FIG. 1, there is shown a sleeping bag 10 comprising an upper cover 12 and lower cover 14. These covers are attached around their periphery to a rigid frame.

Figure 2:
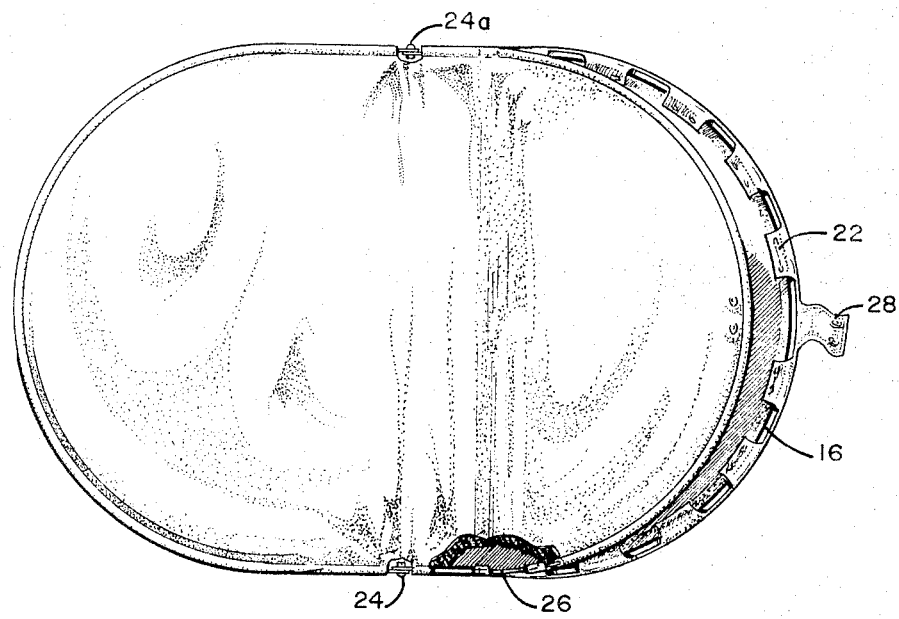
FIG. 2 is a top plan view of the bag of FIG. 1 with a portion of the upper cover cut away to expose a spring member.
Figure 3:
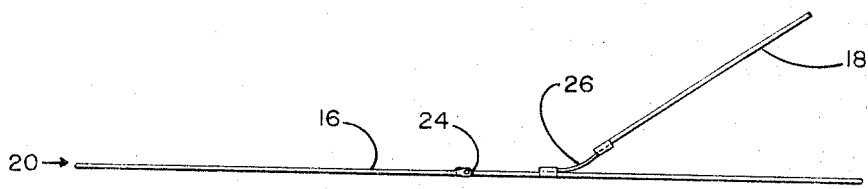
FIG. 3 is a side view of the frame components utilized in the sleeping bag of the invention.

Observing also FIG. 2 and 3, a frame 20 comprises a lower frame component 16 and an upper frame component 18. The lower frame component extends substantially entirely around the periphery of the sleeping bag so that the shape of the bag is substantially the same as the shape of the lower frame component. This specific shape is not particularly critical although an extended or somewhat elongated shape such as that shown is preferred so that the elongated body of an animal lying within the bag may be accommodated. However, alternative to the oblong or elliptical shape shown, a rectangular or other shape may be used within the purview of the invention.

Lower frame component 16 may be prepared of any rigid or semi-rigid material such as tubular or rod shaped metal such as steel, aluminum or the like. The lower frame component may be one piece or if desired may be hinged so that the whole bag and frame can be folded to accommodate a smaller storage space. This latter embodiment will be more fully explained hereinafter.

Upper frame component member 18 may be prepared of the same rod or tubular metal as the lower frame component. Although non-metallics such as rather hard and rigid plastics may be used, they are not usually preferred because they may be more easily broken due to continued use or more easily damaged and require replacement or repair.

An important feature of the device is the normal separation or displacement of the upper and lower frame components as shown whereby the forward end of the sleeping bag is normally maintained in an open position. This is accomplished by use of an upwardly biased spring member 26. This spring is preferably spring steel and is attached along the length of the lower frame component along each side, as shown in FIG. 2 and which is also secured to each of the ends of the upper frame component. Accordingly, the upper frame component 18 is U-shaped and each end is secured to the spring member which is attached to the lower frame component on both sides although this feature is exposed on one side only in FIG. 2. In this manner, and especially as shown in FIG. 1 and 3, spring members 26, one being on each side and secured to each end of the upper frame component along the length of each side of the lower frame component, will provide for maintaining the upper and lower covers open as shown in FIG. 1. In lieu of the spring members, the upper frame component ends may simply be welded or otherwise attached directly to the lower component. This type of attachment may alter the flexibility of opening and closing the open bag end but is not particularly critical.

It will be appreciated that it would normally be quite difficult for an animal to comfortably be situated in the sleeping bag unless an open end is provided. Also, with the opening, i.e., the separation between the upper and lower covers, there is little chance for the upper cover to become inadvertently draped over the animal's head which could cause suffocation. Moreover, with the opening, access to the bag will be much easier for the animal.

The upper and lower covers are preferably removably secured to the frame components as shown in FIG. 1. Accordingly, a plurality of flaps 22 around the cover periphery may be used. Snaps may be provided to secure the edge of the respective covers to the rigid frame but which covers can be removed by disengaging the snaps. This feature is preferred so that the covers may be laundered, cleaned or aired periodically as desired. The use of the disengageable snap flaps 22 is not required and instead, other types of disengaging means such as a zippered flap or flaps extending around the cover, draw strings and the like may be used as well as other equivalent means so long as the covers are removable from the rigid frame. Further, the upper and lower covers may be joined along their common edges, i.e., around the remainder of the cover area that is not to be opened. These upper and lower covers may be joined by stitching or sewing or, even more preferably, may be joined by zipper or snaps along the periphery of the respective covers.

The covers may also include padding, and especially the lower cover may be padded between layers of fabric which make up the lower cover. Cotton, feathers, or synthetic materials such as foam rubber, polyester fill, and the like may be used for that purpose. Such padding will be preferred, especially where a sleeping bag is to be used on a hard surface so that a mattress like bottom or base is present. The upper cover may also comprise an insulation such as cotton, feathers or the like between fabric layers but, usually, unless the sleeping bag is to be used in very cold climates, simply a single fabric layer will be suitable. The fabric used for the upper and lower covers should be selected for ease in cleaning or washing and resistent to stain. Other than meeting those requirements, any fabric including cotton, wool, synthetic or canvas and the like may be utilized.

A preferred embodiment incorporates the use of a pair of hinges 24 and 24a along each side of the lower frame component as shown in FIGS. 2 and 3. The hinges may be any suitable hinge-type device which will provide for folding of the bag including the rigid frame thereby making it more portable or easily stored. Although such a feature may not be necessary for rather small sized bags, it may be more important for larger bags.

Another optional embodiment includes a strap 28 which may be attached to either the upper or lower frame component adjacent the forward and open frame end for holding the frame components closed when desired. To utilize such a feature, as shown in FIG. 1, the upper frame component 18 need merely be compressed until the strap 28 can be engaged to close the opening between the two covers.

It will be evident that the sleeping bag of the invention will provide for domestic animal comfort, especially for housed animals that are not used to temperature extremes or older animals which have developed arthritis or are otherwise uncomfortable on a hard or cold floor or surface. Because of its features in having one open end which remains open due to the separation of the covers, easy access to the bag is achieved. These as well as other advantages will be evident to those skilled in the art.

I claim:

1. A sleeping bag comprising: a frame having a lower rigid frame member comprising a rod extending substantially entirely around the periphery of the bag and an upper frame member comprising a rigid rod having opposite ends secured adjacent opposite sides respectively of the lower member, a pair of spring members attached along opposite sides of the lower member and secured adjacent the ends of the upper member for biasing the upper member upwardly apart from the lower member, and a cover comprising upper and lower covers the lower cover attached substantially along the lower frame member and the upper cover attached along the upper frame member to form a bag normally opened at one end between said upper and lower frame member and closed by urging the upper member downwardly.

2. The bag of claim 1 wherein the cover comprise a fabric like material having disengageable means for being secured along the frame members.

3. The bag of claim 1 including hinges along said lower frame member for folding the bag.

4. The bag of claim 1 including means for securing the upper frame member downwardly in a closed position.

* * * * *